June 20, 1944.　　　H. S. JONES　　　2,352,103
MEASURING AND CONTROL APPARATUS
Filed June 12, 1942
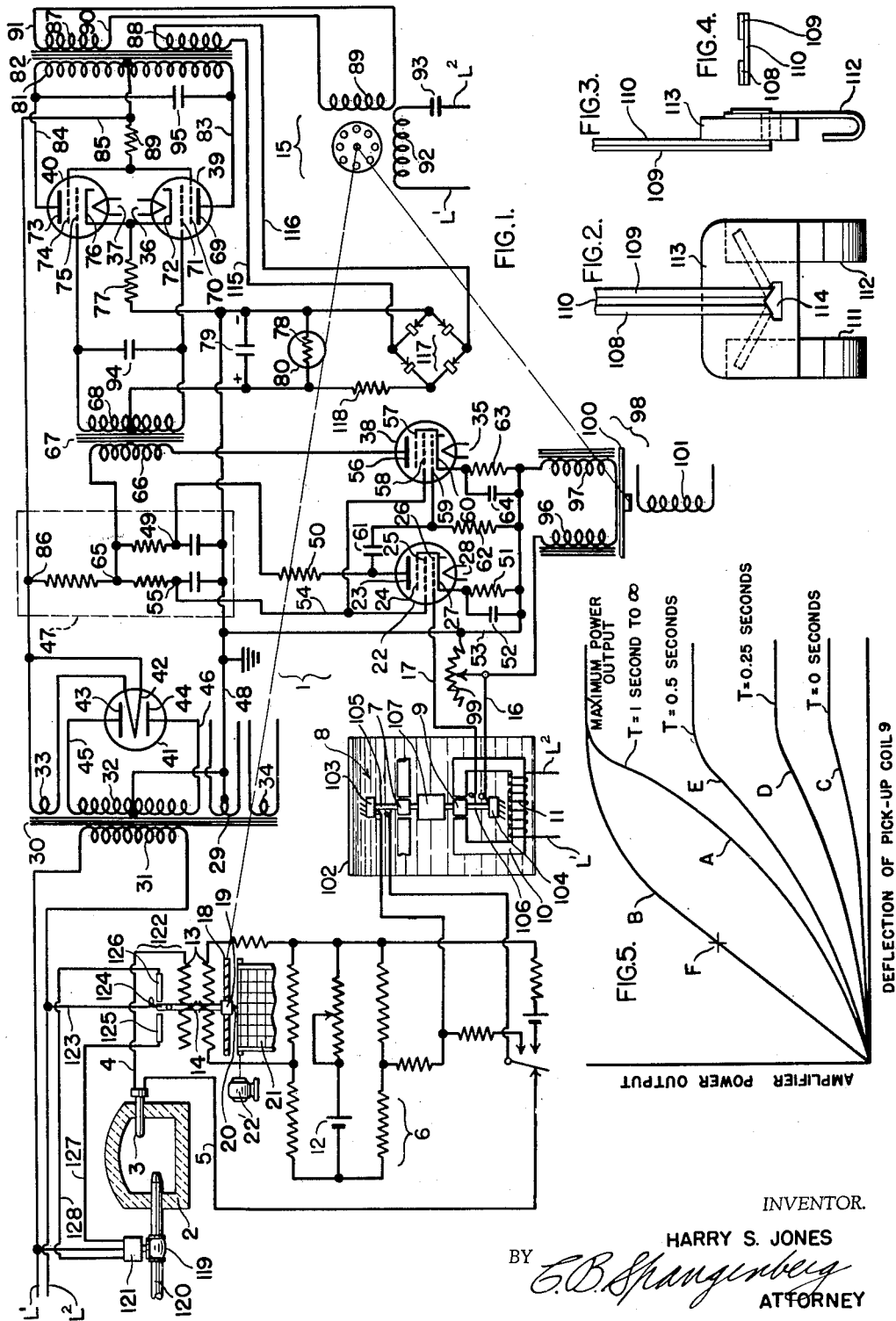
INVENTOR.
HARRY S. JONES
BY C. B. Spangenberg
ATTORNEY Patented June 20, 1944

2,352,103

UNITED STATES PATENT OFFICE 2,352,103

MEASURING AND CONTROL APPARATUS

Harry S. Jones, Washington, D. C., assignor to The Brown Instrument Company, Philadelphia, Pa., a corporation of Pennsylvania Application June 12, 1942, Serial No. 446,828

22 Claims. (Cl. 172—239)

The present invention relates to automatic electrical systems for measuring and/or controlling the magnitude or changes in magnitude of a variable condition, and more particularly, to such systems wherein a delicate and extremely sensitive measuring instrument, for example, a galvanometer, is arranged to control the operation of relatively heavy indicating or recording structure, or control mechanism such as a rheostat or valve. The invention has particular utility in high speed pyrometric recording and controlling systems wherein it is desired to record and control the temperature at one or more remote points, for example, in furnaces or kilns.

In high speed recording and/or controlling apparatus known in the prior art considerable difficulty has been experienced due to undesirable effects produced upon the operation of the apparatus by vibration and shock to which the apparatus is subjected under normal conditions of use. One particularly undesirable effect of vibration and shock upon such prior art apparatus is that the apparatus is rendered erratic and unstable in operation. By means of the present invention the effects of vibration and shock upon the operation of such apparatus has been reduced to a minimum.

A general object of the present invention is to provide simple and efficient means for neutralizing the effects of vibration and shock upon the operation of systems of the type referred to above.

A more specific object of the invention is to provide a supporting structure for the galvanometer which absorbs to a considerable extent the vibration and shock to which apparatus of the type referred to above is subjected under normal conditions of use whereby the effects of vibration and shock upon the operation of the apparatus are substantially reduced.

Another specific object of the invention is to provide means for delaying the response of such apparatus to transient deflections of the galvanometer which may be produced by vibration and shock to thereby minimize the effects of vibration and shock upon the operation of the apparatus.

A further specific object of the invention is to provide a supporting structure for the galvanometer which absorbs the vibration and shock to which such apparatus is subjected, and in addition to provide means for delaying the response of the apparatus to transient galvanometer deflections whereby the effects of vibration and shock upon the operation of the apparatus are reduced to a minimum.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described a preferred embodiment of the invention.

Of the drawing:

Fig. 1 is a diagrammatic illustration of the use of the invention in a self balancing potentiometric network;

Figs. 2-4 illustrate in detail a portion of the supporting structure for the galvanometer in the Fig. 1 arrangement; and Fig. 5 shows curves illustrating the operation of the arrangement of Fig. 1.

In Fig. 1 of the drawing an arrangement including an electronic device 1 to be described is illustrated for producing effects in accordance with the extent of unbalance of a potentiometric network which controls the electronic device and is unbalanced in accordance with the variations in a quantity to be measured and in which because of the small magnitude of the unbalanced electromotive forces produced in the network it is not practical, nor desirable, to have the said effects directly produced by the potentiometric network.

Specifically, an arrangement is illustrated in Fig. 1 for measuring and recording the temperature of a furnace 2 in the interior of which a thermocouple 3 is inserted and is responsive to slight changes in the temperature therein. The terminals of the thermocouple 3 are connected by conductors 4 and 5 to the terminals of a null point potentiometric network 6 which may be of any suitable type such as the Brown potentiometric network disclosed in the Harrison et al. Patent 2,150,502 issued March 14, 1939.

The movable coil 7 of a sensitive galvanometer 8 is connected in the conductor 5 by means including the galvanometer suspension means to be described hereinafter. A pick-up coil 9 which is positioned in an alternating magnetic field and is supported by the same suspension which supports the movable coil 7 of the galvanometer 8 is adapted to be deflected in correspondence with the deflections of the movable coil 7. This pick-up coil 9 is positioned between the poles of a suitable field structure 10 on which is wound a field winding 11 which is energized from alternating current supply conductors $L^1$ and $L^2$ and is so arranged with respect to the field structure 10 that when the galvanometer movable coil 7 is in its undeflected position the pick-up coil 9 is in zero inductive relation to the alternating magnetic field set up in the field structure 10. When the galvanometer movable coil 7 deflects in one direction or the other the pick-up coil 9 deflects accordingly and as a result an alternating voltage in phase with or 180° out of phase with the line voltage is induced in the pick-up coil 9.

The potentiometric network 6 is of a well known type and it is sufficient for the present purposes to point out that the potentiometric network includes a circuit branch including the thermocouple 3 and an opposing circuit branch including a source of known potential such as a battery 12, resistances 13, a variable portion of which may be connected into the opposed branches by means of sliding contact 14 whereby the respective effects of the variable and known sources are made equal and opposite and the galvanometer movable coil 7 is then rendered undeflected when the circuit is balanced for a given value of the E. M. F. of the thermocouple 3 with contact 14 in a corresponding position along resistances 13. The position of the contact 14 along the resistances 13 is then a measure of the value of the electromotive force produced by the thermocouple 3 and may serve as a measure of the temperature to which the thermocouple is exposed.

In this embodiment of my invention the means by which the contact 14 is adjusted back and forth along resistances 13 in response to galvanometer deflection includes a reversible rotating field motor 15 which is adapted to be selectively energized for rotation in one direction or the other from the electronic amplifier 1. When the electromotive force produced by the thermocouple changes in response to a change in temperature within the furnace 2 the galvanometer movable coil 7 will be deflected in one direction or the other and consequently the pick-up coil 9 will be rotated into inductive relation with the alternating magnetic field set up in the field structure 10 resulting in the induction of an alternating voltage in the pick-up coil 9. The phase and amplitude of the alternating voltage so induced in the pick-up coil 9 is determined by the direction and extent of deflection of the latter from its position of zero inductive relation in the magnetic field. This induced alternating voltage is connected by means of the galvanometer suspension means to be described and conductors 16 and 17 to the input circuit of the electronic amplifier 1 so that depending upon the direction of deflection of the movable coil 7 of the galvanometer 8 the motor 15 will be energized for rotation in one direction or the other to effect an adjustment of the sliding contact 14 along the resistances 13 to rebalance the potentiometric network 6.

The shaft of the motor 15 is connected in any convenient manner to a screw threaded shaft 18, and the potentiometer contact 14 is mounted on a carriage 19 which is carried by the shaft 18 and is adapted to be moved in one direction or the other as a shaft 18 is rotated. Thus, when the motor 15 is energized for rotation as a result of change in thermocouple electromotive force the motor will effect movement of the contact 14 along the resistances 13 in the proper direction until the potentiometric network 6 is again balanced. The galvanometer deflection will then be reduced to zero and the motor will come to rest with the contact 14 at a new position along the resistances 13, which position will then be a measure of the temperature of the interior of the furnace 1.

If desired, a pen 20 may be mounted on the carriage which carries potentiometer contact 14 and arranged in cooperative relation with a recorder chart 21 to thereby provide a continuous record of the temperature of the interior of the furnace 1. The chart 21 may be a strip chart as shown and is adapted to be driven in any convenient manner as, for example, by a unidirectional electrical motor 22' through suitable gearing (not shown) so that the record of the temperature to which the thermocouple 3 is subjected will be recorded as a continuous line on the chart.

The electronic amplifier 1 referred to includes an electronic valve 22 to the input circuit of which the voltage induced in the pick-up coil 9 is applied. Valve 22 is a heater type pentode and includes an anode 23, a suppressor grid 24, a screen grid 25, a control grid 26, a cathode 27 and a filament 28. The filament 28 is connected by conductors not shown in order not to confuse the drawing to the low voltage secondary winding 29 of a transformer 30 having a line voltage primary winding 31, a high voltage secondary winding 32, and low voltage secondary windings 33 and 34 in addition to the low voltage secondary winding 29. The low voltage secondary winding 29 is also connected to and supplies energizing current to the heater filaments 35, 36 and 37 of electronic valves 38, 39 and 40, respectively.

An electronic valve 41 is also utilized, which valve may be a conventional full wave rectifier, and is employed to provide a source of direct current voltage for energizing the output circuit of the valves 22, 38, 39 and 40. Valve 41 includes a filament cathode 42 and anodes 43 and 44. The filament cathode 42 of valve 41 is connected to the low voltage transformer secondary winding 33 and receives energizing current therefrom. The anodes 43 and 44 are connected by conductors 45 and 46 with the terminals of the high voltage secondary winding 32, and the rectified current is connected across the input terminals of a suitable filter 47. A center tap on the secondary winding 32 is connected by a grounded conductor 48 to one input terminal of the filter 47 which is indicated by dotted lines and the other input terminal of the filter is connected to the filament cathode 42 so that a direct current voltage is maintained across the filter. The output terminals of the filter 47 are connected to the output circuits of the electronic valves 22, 38, 39 and 40, and therefore, due to the filtering action of the filter a direct current voltage substantially free from alternating components is applied to the anode circuits of the valves 22, 38, 39 and 40.

The output circuit of valve 22 may be traced from a positive terminal 49 of the filter 47 through a resistance 50 to anode 23, cathode 27, a biasing resistance 51 which is shunted by a condenser 52 and a conductor 53 to the grounded and negative terminal of the filter 47. The suppressor grid 24 of valve 22 is directly connected to the cathode 27 and the screen grid 25 is connected by a conductor 54 to the positive terminal 55 of the filter 47.

The voltage induced in the pick-up coil 9 is impressed by the conductors 16 and 17 between the control grid 26 and cathode 27 of valve 22 through the biasing resistance 51, and the output circuit of the valve 22 is resistance capacity coupled to the input circuit of the electronic valve 38 which, as shown, is also a heater type pentode. The electronic valves 22 and 38 may desirably be of the type known commercially as the 6J7.

Valve 38 includes an anode 56, a suppressor grid 57, a screen grid 58, a control grid 59 and a cathode 60 in addition to the filament 35. The suppressor grid 57 is directly connected to the cathode 60 and the screen grid 58 is connected by conductor 54 to the positive terminal 55 of the filter 47. The control grid 59 is connected through a condenser 61 to the anode 23 of valve 22 and is also connected through a resistance 62 and a biasing resistance 63 which is shunted by a condenser 64 to the cathode 60. The output circuit of valve 38 may be traced from the positive terminal 65 of the filter 47 through the primary winding 66 of a transformer 67 having a center tapped secondary winding 68 to the anode 56, cathode 60, the biasing resistance 63 and condenser 64 to the conductor 53 and thereby to the negative terminal of the filter.

The output circuit of valve 38 is coupled by the transformer 67 to the input circuits of the valves 39 and 40. The valves 39 and 40 are heater type tetrodes, and may desirably be type 6L6's. As illustrated, the valves 39 and 40 are connected in push-pull. In addition to the filament 36, valve 39 includes an anode 69, a screen grid 70, a control grid 71 and a cathode 72, and in addition to the filament 37 valve 40 includes an anode 73, a screen grid 74, a control grid 75, and a cathode 76. One terminal of the transformer secondary winding 68 is connected to the control grid 71, the other terminal is connected to the control grid 75, and the cathodes 72 and 76 are connected by a resistance 77, and a resistance 78 which is shunted by a condenser 79 to the center tap on the winding 68. The resistance 78, which may desirably comprise the filament of a lamp 80, and the condenser 79 provide a bias voltage for the input circuits of valves 39 and 40 and are utilized for a purpose explained in detail hereinafter.

The anodes 69 and 73 are connected to opposite terminals of the primary winding 81 of a transformer 82 by conductors 83 and 84, respectively. A center tap on the primary winding 81 is connected by a conductor 85 to the positive terminal 86 of the filter 47, and the negative terminal of the filter 47, which terminal as noted above is grounded, is connected to the negative end of the resistance 77 and therethrough to the cathodes 72 and 76. The transformer 82 is also provided with two secondary windings 87 and 88. As shown, the screen grids 70 and 74 are connected together and are connected through a resistance 89 to the positive terminal 86 of the filter 47.

In operation when an alternating voltage is applied to the input circuit of the valve 22 by the pick-up coil 9, the valve 22 is alternately rendered more conductive and less conductive at the frequency of the voltage of the supply lines L¹ and L², and consequently, a pulsating potential drop is produced across the resistance 50 in the anode circuit of valve 22. This pulsating potential drop will be in phase with the supply line voltage or displaced 180° in phase therefrom depending upon the direction of deflection of the pick-up coil 9 from its position of zero inductive relation in the field structure 10 and the magnitude thereof will vary in accordance with the extent of deflection of the pick-up coil 9 from that position. The pulsating voltage so derived is applied by means of the condenser 61 and resistance 62 to the input circuit of valve 38. The valve 38 is thus alternately rendered more conductive and less conductive at the supply line frequency, and accordingly, a pulsating current flows through the transformer primary winding 66, which pulsating current will vary in phase and magnitude in accordance with the phase and magnitude of the pulsating potential drop produced across the resistance 50. This pulsating current flow through the transformer primary winding 66 causes the induction of an alternating voltage in the secondary winding 68 which will vary in phase and magnitude in accordance with the phase and magnitude of the pulsating current in the primary winding 66.

When an alternating voltage is thus produced across the terminals of the secondary winding 68, the potentials of the control grids 71 and 75 are swung in opposite phase at a frequency corresponding to the supply line frequency, and the valves 39 and 40 are alternately rendered conductive and non-conductive, one valve being conductive while the other is non-conductive. The resulting pulsating current flows through the transformer primary winding 81 in successively opposite directions through the opposite halves of the transformer result in the induction of an alternating voltage of line frequency in the transformer secondary windings 87 and 88 whose phase and amplitude is determined by the direction and extent of deflection of the pick-up coil 9 from its normal position of zero inductive relation in the field structure 10.

The terminals of the transformer secondary winding 87 are connected to one phase winding 89 of the two-phase rotating field motor 15 by conductors 90 and 91, and the other phase winding 92 of the motor is connected to the supply lines L¹ and L² through a suitable condenser 93. Due to the action of the condenser 93 the current flow through the motor winding 92 will lead the line current by approximately 90° and since the motor winding 89 is arranged to be energized by currents in phase with or 180° out of phase with the line current, the magnetic fields set up by these windings will be displaced by approximately 90° in space with the result that a rotating magnetic field will be set up in the motor 15 in one direction or the other and the motor rotor will accordingly be rotated in a corresponding direction. Thus, depending upon the direction of deflection of the pick-up coil 9 and thereby upon the direction of unbalance of the potentiometric network 7, the motor 15 will be selectively energized for rotation in one direction or the other, and it will be apparent the motor speed will be directly dependent upon the magnitude of the potentiometric unbalance current flow.

As illustrated, condensers 94 and 95 are connected across the transformer windings 68 and 81, respectively. Due to the action of condenser 94 a full wave electromotive force is impressed on the control grids 71 and 75 from the half wave impulses impressed upon the transformer primary winding 66 through the half wave rectifying action of the valve 38. The condenser 95 tunes to resonance the transformer 82 and its load consisting of the motor windings so that the current flows through the motor winding 89 will be at a maximum value for any unbalance of the potentiometric network 6.

In order that the speed of motor 15 may be as great as possible during rebalancing of the potentiometric network 4 without overshooting of the balance point and consequent hunting taking place, means have been provided to ensure that the motor speed and the rate of change of its speed is substantially proportional to the extent of unbalance. This result is obtained by introducing into the network in series with the alternating voltage derived from the pick-up coil 9 a voltage whose magnitude is a function of the motor speed. Thus, as the slidewire contact 14 approaches its new balance position, the deflection of the pick-up coil 9 will decrease and accordingly, the alternating voltage derived from the latter will decrease in value and if the motor speed is then such that it would ordinarily coast beyond the balance position due to its inertia, the opposing voltage which is introduced in circuit will be appreciably greater than the unbalance voltage and will tend to effect energization of the motor in the opposite direction and thereby produce a positive damping action which will check the motor speed before balance is reached and gradually reduce it to zero as the potentiometric unbalance is reduced to zero.

Specifically, a pair of opposed windings 96 and 97 of an induction disc generator 98 are connected in series in the input circuit of the valve 22 in series with the pick-up coil 9, and the windings 96 and 97 are so arranged that the generated voltage will be opposed to the voltage produced in the pick-up coil 9. A variable resistor 99 is connected across the generator coils 96 and 97 and is provided for permitting adjustment of the magnitude of the voltage opposed to the voltage of pick-up coil 9 to be readily made.

The induction disc generator 98 comprises a rotatable aluminum or copper disc 100 which may be driven directly from the shaft of motor 15 or through suitable gearing, as desired, and also includes a winding 101 which is connected by conductors not shown to the transformer secondary winding 34 and receives energizing current therefrom. The winding 101 is arranged on one side of the disc 100 in such manner that the alternating magnetic flux set up by it will pass through the disc 100, and the opposed windings 96 and 97 are arranged side by side on the opposite side of the disc in such positions relative to the winding 101 that when the disc 100 is stationary equal numbers of lines of the alternating magnetic flux set up by winding 101 will pass through them. Thus, equal and opposite alternating voltages will be induced in the windings 96 and 97 with the result that normally the resultant damping voltage will be zero. When the disc 100 is rotated, however, the alternating magnetic flux set up by the winding 101 is distorted, and depending upon the direction of rotation of the disc, more lines of flux will pass through one opposed winding 96 or 97 than the other, resulting in the appearance of an alternating voltage across the terminals of these windings.

This induced voltage will be substantially in phase with the line voltage or displaced 180° therefrom depending upon the direction of rotation of the disc 100, and as will be apparent, the amplitude of the induced voltage will be directly dependent upon the speed of rotation of the disc. That is, if the speed of rotation of the disc is small, the degree of distortion of the alternating magnetic field set up by the winding 101 is correspondingly small, and as a result the voltage induced in the windings 96 and 97 will be nearly equal so that their resultant voltage is small. As the speed of rotation of the disc becomes greater, however, the degree of distortion of the magnetic field will become greater, and thereby the voltage induced in one or the other of the windings 96 or 97 will become greater to a corresponding extent than the voltage induced in the other winding.

In accordance with the present invention the tendency of vibration and shock to render the apparatus unstable and erratic in operation has been avoided by providing a supporting structure for the galvanometer movable coil 7 and the pick-up coil 9 which absorbs to a considerable extent such vibration and shock, and also by providing an arrangement for delaying the energization of the reversible electrical motor 15 in response to deflection of the pick-up coil 9 for a suitable time interval whereby the motor operation is rendered substantially independent of transient deflections of the pick-up coil 9.

Specifically, the galvanometer including the movable coil 7 and the field structure 10 and pick-up coil 9 are immersed in a suitable electrically non-conductive liquid such, for example, as oil contained within a container 102. The movable coils 7 and 9 are suspended between fixed supports 103 and 104 of insulating material which are mounted in any convenient manner within the container 102 by suitable suspensions 105 and 106 which are illustrated in detail in Figs. 2–4. In addition, a float 107 rigid with the coils 7 and 9 is provided between the latter. The float 107 is of such density that the rigid unit comprised of the coils 7 and 9 and the float 107 is of approximately the same average density as the liquid contained within the container 102. With this arrangement it will be readily recognized that the susceptibility of the galvanometer and pick-up coil structure to vibration and shock will be appreciably reduced.

The suspensions 105 and 106 may be exactly alike, and as shown in Figs. 2–4, comprise two thin metallic and ribbon-like conductors 108 and 109 which are insulated from each other and are fastened side by side in any convenient manner to a strip of Cellophane 110. One end of the suspension 105 is suitably fastened to the galvanometer coil 7 and the other end is connected to the support 103. Similarly one end of the suspension 106 is suitably fastened to the pick-up coil 9 and the other end is connected to the support 104. The ribbon-like conductors of the suspension 105 conduct the unbalanced potentiometric currents to the galvanometer coil 7, and the corresponding conductors of the suspension 106 conduct the alternating currents derived in the pick-up coil 9 to the conductors 16 and 17.

The means for connecting the suspensions 105 and 106 to the supports 103 and 104, respectively, comprise a pair of hooks 111 and 112 and a part 113 of insulating material to which the hooks 111 and 112 are rigidly fastened on one side as shown. An opening 114 is provided in the part 113 through which the ribbon-like conductors 108 and 109 are passed from the other side of the part 113, and the conductors 108 and 109 are soldered or otherwise connected to the hooks 111 and 112, respectively. It is noted the electrical circuits for the coils 7 and 9 are completed through the hooks 111 and 112. This arrangement for suspending the coils 7 and 9 is characterized in that it appreciably simplifies the construction of the apparatus and in addition reduces to a minimum the number of adjustments required.

The arrangement referred to hereinbefore for delaying the energization of the reversible electrical motor 15 in response to deflection of the pick-up coil 9 to thereby render the operation of the motor 15 substantially independent of transient deflections of the pick-up coil 9 includes the resistance 78 of lamp 80 and the condenser 79 which are connected in the input circuits of the valves 39 and 40. In addition, as illustrated, the transformer secondary winding 88 is connected by conductors 115 and 116 to the input terminals of a full wave rectifier 117 which may desirably be of the copper oxide type, and the output terminals of the rectifier 117 are connected through a resistance 118 across the resistance 78 and condenser 79. The rectifier 117 is so connected in the circuit that when an alternating voltage is induced in the transformer secondary winding 88, a direct current potential of the polarity indicated in Fig. 1 is produced across the condenser 79.

In accordance with the present invention the biasing resistance 77 is so chosen as to bias negatively the control grids 71 and 75 of the electronic valves 39 and 40 to an extent greater than that required for maximum power output from the amplifier 1. Part of the amplifier output is fed from the transformer secondary winding 88 through the rectifier 117 to the resistance 78 to thereby produce a direct current potential across the latter of the proper polarity to oppose the biasing potential across the resistance 77. Thus, as the power output from the amplifier 1 gradually increases from some small value, the negative bias on the control electrodes 71 and 75 is gradually decreased, and as a consequence, the power output from the amplifier 1 then increases rapidly as illustrated by curve A in Fig. 5. In Fig. 5 the horizontal axis indicates the degree of deflection of the pick-up coil 9 from the position of zero inductive relation with the alternating field set up by the field structure 10, and the vertical axis indicates the power output from the amplifier 1.

In Fig. 5 curve B illustrates the general form of the relation between the extent of deflection of the coil 9, or in effect the input voltage to the amplifier 1, and the power output from the amplifier which is obtained when the deflection and time delay provisions including elements 88, 117, 78 and 79 are not employed. On curve B the point F represents the amplifier power output which is necessary to actuate the reversible motor 15 for rotation. The additional power output obtainable represents reserve to overcome excessive friction of the motor shaft, contact 14 along resistances 13, and pen 20 along chart 21, etc.

It will be apparent to those skilled in the art that curve A represents a more desirable relation than that shown by curve B since almost twice as much deflection of the pick-up coil 9 is required to produce the same output from the amplifier 1 as represented by the point F while no greater deflection of the pick-up coil 9 is required for maximum output from the amplifier than in curve B.

Curve C represents a still more desirable relation than curve B. Curve C indicates small power output from the amplifier 1 for very sudden or practically instantaneous deflections of the pick-up coil 9 which may be caused by vibration or shock not eliminated by the immersion of the galvanometer structure in the liquid in container 102. Curves D, E and A show the increased output from the amplifier 1 for slower deflections of the pick-up coil 9 requiring the times T=0.25 second, T=0.50 second, and T=1 second to infinity to reach the value for maximum torque. Thus, for sudden deflections of the pick-up coil 9 due to shock or vibration, the power output obtainable from the amplifier will not be sufficient to energize the motor 15 to produce motion of the contact 14 and pen 20. It will be understood that the times or values of T indicated are merely illustrative and that these or other values may be found most desirable to employ in practical embodiments of the invention depending upon the design.

Curve A, therefore, illustrates the "deflection delay" characteristic and curves C, D and E illustrate the "time delay" characteristic. These two characteristics are obtained simultaneously by means of the circuit arrangement shown in Fig. 1 and described above and including the elements 88, 117, 78, and 79.

It is noted that when the resistance 78 is of the type which has an appreciable temperature coefficient of resistance, that is increases in resistance several times, for example, five or six times in a second or two when heated, a time delay characteristic as shown in curves C, D and E may be obtained. Condenser 79 is utilized to filter the output of the rectifier 117 and may also be so chosen as to increase the time lag of the resistance 78.

This arrangement provides a simple and efficient means for obtaining deflection and time delay, and is operative to greatly reduce the effects of shocks and vibration upon the operation of the apparatus.

It will be apparent that the reversible electrical motor 15 may be employed to operate a valve 119 positioned in a fuel supply pipe 120 to the furnace 2 for varying the supply of heating agent to the furnace 2, or preferably a separate reversible electrical motor may be so employed. For example, as illustrated in the drawing a reversible electrical motor 121 having two opposed field windings (not shown) may be used for this purpose. The reversible motor 121 is mechanically connected in any suitable manner to the valve 119 and is adapted to adjust the latter to its open or closed position depending upon the direction to which the motor 121 is energized for rotation. The mechanical connection of the motor 121 to the valve 119 is such as to increase and decrease the supply of heating agent to the furnace 2 as the furnace temperature falls below or rises above a predetermined level.

The motor 121 is energized for rotation in one direction or the other depending upon which of the two opposed field windings is energized by means of a switch 122. As illustrated in Fig. 1 current flows from the supply line $L^2$ through a conductor 123 to a switch arm 124 which is insulated from but may be carried by the carriage 19 which carries the potentiometric slidewire contact 14 and the pen 20, thence by either of two spaced contacts 125 or 126, conductors 127 or 128, and one field or the other field of the motor 121 to the supply line $L^1$. Although not shown the contacts 125 and 126 of the switch 122 are made adjustable so that both the control point setting and sensitivity of the apparatus may be set in a manner well known in the art.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent, is:

1. In combination, a primary deflecting element responsive to a variable condition, to establish an alternating field including an element adapted to be connected to a source of alternating current, a pick-up coil disposed in said field, a mechanical connection between said primary deflecting element and said pick-up coil whereby the latter is rotated to zero inductive position in said alternating field or in either direction therefrom to thereby cause the induction of an alternating current of one phase or of opposite phase in said pick-up coil accordingly as said condition varies, a container including a liquid in which said primary deflecting element and pick-up coil are immersed, said liquid tending to absorb shock and vibration to which said primary deflecting element and pick-up coil would otherwise be subjected, a secondary element mechanically separate from said primary deflecting element and adapted to be deflected in one sense or in another sense under control of said primary deflecting element, and phase responsive means controlled by said pick-up coil to deflect said secondary element said phase responsive means including means to render the operation of said secondary element substantially independent of both transient deflections of said galvanometer and small, gradual deflections thereof.

2. In combination, a primary deflecting element responsive to a variable condition, means to establish an alternating field including an element adapted to be connected to a source of alternating current, a pick-up coil disposed in said field, a mechanical connection between said primary deflecting element and said pick-up coil whereby the latter is rotated to zero inductive position in said alternating field or in either direction therefrom to thereby cause the induction of an alternating current of one phase or of opposite phase in said pick-up coil accordingly as said condition varies, a container including a liquid in which said primary deflecting element and pick-up coil are immersed, said liquid tending to absorb shock and vibration to which said primary deflecting element and pick-up coil would otherwise be subjected, a float rigid with said primary deflecting element and said pick-up coil and also immersed within said liquid, said float having a density such that the average density of said primary deflecting element, said pick-up coil and said float is approximately the same as said liquid, a secondary element mechanically separate from said primary deflecting element and adapted to be deflected in one sense or in another sense under control of said primary deflecting element, and phase responsive means controlled by said pick-up coil to deflect said secondary element said phase responsive means including means to render the operation of said secondary element substantially independent of both transient deflections of said galvanometer and small, gradual deflections thereof.

3. Measuring apparatus including a self balancing electrical network, means responsive to the variations in a condition under measurement to unbalance said network, a device to rebalance said network, and means to control the operation of said device including a primary deflecting element responsive to the state of balance of said network, means to establish an alternating field including an element adapted to be connected to a source of alternating current, a pick-up coil disposed in said field, a mechanical connection between said primary deflecting element and said pick-up coil whereby the latter is rotated to zero inductive position in said alternating field or in either direction therefrom to thereby cause the induction of an alternating current of one phase or of opposite phase in said pick-up coil accordingly as said condition varies, a container including a liquid in which said primary deflecting element and pick-up coil are immersed, said liquid tending to absorb shock and vibration to which said primary deflecting element would otherwise be subjected, a float rigid with said primary deflecting element and said pick-up coil and also immersed within said liquid, said float having a density such that the average density of said primary deflecting element, said pick-up coil and said float is approximately the same as said liquid, and phase responsive means controlled by said pick-up coil to actuate said device said phase responsive means including means to render the operation of said device substantially independent of both transient deflections of said galvanometer and small, gradual deflections thereof.

4. Measuring apparatus including a self balancing electrical network, means responsive to the variations in a condition under measurement to unbalance said network, a device to rebalance said network, a reversible electrical motor to actuate said device, and means to control the operation of said device including a primary deflecting element responsive to the state of balance of said network, means to establish an alternating field including an element adapted to be connected to a source of alternating current, a pick-up coil disposed in said field, a mechanical connection between said primary deflecting element and said pick-up coil whereby the latter is rotated to zero inductive position in said alternating field or in either direction therefrom to thereby cause the induction of an alternating current of one phase or of opposite phase in said pick-up coil accordingly as said condition varies, a container including a liquid in which said primary deflecting element and pick-up coil are immersed, said liquid tending to absorb shock and vibration to which said primary deflecting element would otherwise be subjected, a float rigid with said primary deflecting element and said pick-up coil and also immersed within said liquid, said float having a density such that the average density of said primary deflecting element, said pick-up coil and said float is approximately the same as said liquid, and phase responsive means controlled by said pick-up coil to control the energization of said reversible electrical motor said phase responsive means including means to render the operation of said motor substantially independent of both transient deflections of said galvanometer and small, gradual deflections thereof.

5. In combination, a primary deflecting element responsive to a variable condition, means to establish an alternating field including an element adapted to be connected to a source of alternating current, a pick-up coil disposed in said field, a mechanical connection between said primary deflecting element and said pick-up coil whereby the latter is rotated to zero inductive position in said alternating field or in either direction therefrom to thereby cause the induction of an alternating current of one phase or of opposite phase in said pick-up coil accordingly as said condition varies, a container including a liquid in which said primary deflecting element and pick-up coil are immersed, said liquid tending to absorb shock and vibration to which said primary deflecting element and pick-up coil would otherwise be subjected, a secondary element mechanically separate from said primary deflecting element and adapted to be deflected in one sense or in another sense under control of said primary deflecting element, phase responsive means controlled by said pick-up coil to actuate said secondary element in said one sense or said another sense depending upon the phase of the alternating current induced in said pick-up coil, and means responsive to deflections of said pick-up coil to control the operation of said last mentioned means to render the operation of said secondary element substantially independent of transient deflections of said primary deflecting element and pick-up coil.

6. Measuring apparatus including a self balancing electrical network, means responsive to the variations in a condition under measurement to unbalance said network, a device to rebalance said network, a reversible electrical motor to actuate said device, and means to control the operation of said device including a primary deflecting element responsive to the state of balance of said network, means to establish an alternating field including an element adapted to be connected to a source of alternating current, a pick-up coil disposed in said field, a mechanical connection between said primary deflecting element and said pick-up coil whereby the latter is related to zero inductive position in said alternating field or in either direction therefrom to thereby cause the induction of an alternating current of one phase or of opposite phase in said pick-up coil accordingly as said condition varies, a container including a liquid in which said primary deflecting element and pick-up coil are immersed, said liquid tending to absorb shock and vibration to which said primary deflecting element would otherwise be subjected, a float rigid with said primary deflecting element and said pick-up coil and also immersed within said liquid, said float having a density such that the average density of said primary deflecting element, said pick-up coil and said float is approximately the same as said liquid, phase responsive means controlled by said pick-up coil to control the energization of said reversible electrical motor, and means responsive to deflections of said pick-up coil to control the operation of said phase responsive means to render the operation of said reversible electrical motor substantially independent of transient deflections of said primary deflecting element and pick-up coil.

7. Measuring apparatus including a self balancing electrical network, means responsive to the variations in a condition under measurement to unbalance said network, a device to rebalance said network, a reversible electrical motor to actuate said device, and means to control the operation of said device including a primary deflecting element responsive to the state of balance of said network, means to establish an alternating field including an element adapted to be connected to a source of alternating current, a pick-up coil disposed in said field, a mechanical connection between said primary deflecting element and said pick-up coil whereby the latter is related to zero inductive position in said alternating field or in either direction therefrom to thereby cause the induction of an alternating current of one phase or of opposite phase in said pick-up coil accordingly as said condition varies, a container including a liquid in which said primary deflecting element and pick-up coil are immersed, said liquid tending to absorb shock and vibration to which said primary deflecting element would otherwise be subjected, a float rigid with said primary deflecting element and said pick-up coil and also immersed within said liquid, said float having a density such that the average density of said primary deflecting element, said pick-up coil and said float is approximately the same as said liquid, electronic means having an amplifying stage and a motor driving stage, a connection between said pick-up coil and the input circuit of said amplifying stage, a connection between the output circuit of said amplifying stage and the input circuit of said motor driving stage, a connection between the output circuit of said motor driving stage and said reversible electrical motor, means to bias the input circuit of said motor driving stage in such a manner as to tend to maintain the output current from said motor driving stage insufficient to actuate said motor for rotation, and delayed operating means to feed back at least part of the current from the output circuit of said motor driving stage to the input circuit thereof to neutralize the effect of said biasing means.

8. The combination of claim 7 wherein said delayed operating means comprises a rectifier, a connection from the output circuit of said amplifier to the input circuit of said rectifier, a resistance connected to the output circuit of said rectifier and also connected in the input circuit of said motor driving stage, said resistance having an appreciable temperature coefficient of resistance, and a condenser connected across said resistance.

9. In combination, a primary deflecting element responsive to a variable condition, a container including a liquid in which said primary deflecting element is immersed, said liquid tending to absorb shock and vibration to which said primary deflecting element otherwise would be subjected, a phase responsive secondary element mechanically separate from said primary deflecting element and adapted to be actuated under control of said primary deflecting element, means to translate the deflections of said primary deflecting element from a predetermined position into an alternating current of one phase or of opposite phase, electronic amplifying means having a plurality of stages and having an input circuit to which said alternating current is impressed and an output circuit controlled by said input circuit, a connection between the output circuit of said electronic amplifying means and said phase responsive secondary element, means to bias the input circuit of one of the stages of said amplifying means tending to maintain the output current from said amplifier insufficient to actuate said phase responsive secondary element, and delayed operating means to feed back at least part of the current from the output circuit of said electronic amplifying means to the input circuit of said one stage to neutralize the effect of said biasing means.

10. In combination, a primary deflecting element responsive to a variable condition, a container including a liquid in which said primary deflecting element is immersed, said liquid tending to absorb shock and vibration to which said primary deflecting element otherwise would be subjected, a secondary element mechanically separate from said primary deflecting element and adapted to be deflected under control of said primary deflecting element, means to translate the deflections of said primary deflecting element into a fluctuating current, electronic amplifying means having an input circuit to which said fluctuating current is impressed and an output circuit controlled by said input circuit, a connection between the output circuit of said electronic amplifying means and said secondary element, means to bias the input circuit of said electronic amplifying means tending to maintain the output current from said amplifier insufficient to actuate said secondary element, and delayed operating means to feed back at least part of the current from the output circuit of said electronic amplifying means to the input circuit thereof to neutralize the effect of said biasing means.

11. The combination of claim 10 wherein said delayed operating means comprise a rectifier, a connection from the output circuit of said amplifier to the input circuit of said rectifier, a resistance connected to the output circuit of said rectifier and also connected in the input circuit of said electronic amplifying means, said resistance having an appreciable temperature coefficient of resistance, and a condenser connected across said resistance.

12. In combination, a primary deflecting element responsive to a variable condition, a secondary element mechanically separate from said primary deflecting element and adapted to be deflected under control of primary deflecting element, means to translate the deflections of said primary deflecting element from a predetermined position into a fluctuating current, electronic amplifying means having an input circuit to which said fluctuating current is impressed and an output circuit controlled by said input circuit, a connection between the output circuit of said electronic amplifying means and said secondary element, means to bias the input circuit of said electronic amplifying means tending to maintain the output current from said amplifier insufficient to actuate said secondary element, and delayed operating means to feed back at least part of the current from the output circuit of said electronic amplifying means to the input circuit to neutralize the effect of said biasing means.

13. The combination of claim 12 wherein said delayed operating means comprise a rectifier, a connection from the output circuit of said amplifier to the input circuit of said rectifier, and a resistance having a appreciable temperature coefficient of resistance connected to the output circuit of said rectifier and also connected in the input circuit of said electronic amplifying means.

14. Measuring apparatus including a self balancing electrical network, means responsive to the variations in a condition under measurement to unbalance said network, a device to rebalance said network, a reversible electrical motor to actuate said device, and means to control the operation of said motor including a primary deflecting element responsive to the state of balance of said network, means to translate the deflections of said primary deflecting element from a predetermined position into an alternating current of one phase or of opposite phase, electronic amplifying means having an input circuit and an output circuit, means to apply said alternating voltage to the input circuit of said electronic amplifying means, a connection between the output circuit of said electronic amplifying means and said reversible electrical motor, means to bias the input circuit of said electronic amplifying means in such manner as to tend to maintain the output current from said electronic amplifying means insufficient to actuate said motor for rotation, and delayed operating means to feed back at least part of the current from the output circuit of said electronic amplifying means to the input circuit thereof to neutralize the effect of said biasing means.

15. Measuring apparatus including a self balancing electrical network, means responsive to the variations in a condition under measurement to unbalance said network, a device to rebalance said network, a reversible electrical motor to actuate said device, and means to control the operation of said motor including a primary deflecting element responsive to the state of balance of said network, means to establish an alternating field including an element adapted to be connected to a source of alternating current, a pick-up coil disposed in said field, a mechanical connection between said primary deflecting element and said pick-up coil whereby the latter is rotated to zero inductive position in said alternating field or in either direction therefrom to thereby cause the induction of an alternating current of one phase or of opposite phase in said pick-up coil accordingly as said condition varies, electronic amplifying means having an amplifying stage and a motor driving stage, a connection between said pick-up coil and the input circuit of said amplifying stage, a connection from the output circuit of said amplifying stage and the input circuit of said motor driving stage, a connection between the output circuit of said motor driving stage and said reversible electrical motor, means to bias the input circuit of said motor driving stage in such a manner as to tend to maintain the output current from said motor driving stage insufficient to actuate said motor for rotation, and delayed operating means to feed back at least part of the current from the output circuit of said motor driving stage to the input circuit thereof to neutralize the effect of said biasing means.

16. The combination of claim 15 wherein said delayed operating means comprises a rectifier, a connection from the output circuit of said motor driving stage to the input circuit of said rectifier, a resistance connected to the output circuit of said rectifier and also connected in the input circuit of said motor driving stage, said resistance having an appreciable temperature coefficient of resistance, and a condenser connected across said resistance.

17. In combination, a primary deflecting element responsive to a variable condition, a secondary element adapted to be deflected under control of said primary deflecting element, electronic amplifying means having an input circuit controlled by said primary deflecting element and an output circuit controlled by said input circuit, a connection between the output circuit of said electronic amplifying means and said secondary element, means to bias the input circuit of said electronic amplifying means tending to maintain the output current from said amplifying means insufficient to actuate said secondary element, and delayed operating means to feed back at least a part of the current from the output circuit of said electronic amplifying means to the input circuit to neutralize the effect of said biasing means.

18. In combination, a galvanometer responsive to a variable condition, an exhibiting element mechanically separate from said galvanometer and adapted to be actuated under control of said galvanometer, means controlled by said galvanometer to actuate said exhibiting element, and means controlled by said galvanometer to control the operation of said last mentioned means to render the operation of said exhibiting element substantially independent of both transient deflections of said galvanometer and small, gradual deflections thereof.

19. In combination, a galvanometer having a movable element which deflects in accordance with the variations in a variable condition, a container including a liquid in which said galvanometer is immersed, said liquid tending to absorb shock and vibration to which said galvanometer would otherwise be subjected, a float rigid with the movable element of the galvanometer and also immersed within said liquid, said float having a density such as to tend to equalize the average density of said galvanometer movable element and said float and the density of said liquid, an exhibiting element mechanically separate from said galvanometer and adapted to be deflected under control of said galvanometer, means controlled by said galvanometer to deflect said exhibiting element, and means controlled by said galvanometer to control the operation of said last mentioned means to render the operation of said exhibiting element substantially independent of both transient deflections of said galvanometer and small, gradual deflections thereof.

20. In combination, a galvanometer having an element deflecting in response to variations in a variable condition, a container including a liquid in which said galvanometer is immersed, said liquid tending to absorb shock and vibration to which said galvanometer otherwise would be subjected, an exhibiting element mechanically separate from said galvanometer and adapted to be deflected under control of said galvanometer, means controlled by said galvanometer to deflect said exhibiting element, and means controlled by said galvanometer to control the operation of said last mentioned means to render the operation of said exhibiting element substantially independent of both transient deflections of said galvanometer and also small, gradual deflections thereof.

21. In combination, a primary deflecting element responsive to a variable condition, means to establish an alternating field including an element adapted to be connected to a source of alternating current, a pick-up coil disposed in said field, a mechanical connection between said primary deflecting element and said pick-up coil whereby the latter is rotated to zero inductive position in said alternating field or in either direction therefrom to thereby cause the induction of an alternating current of one phase or of opposite phase in said pick-up coil accordingly as said condition varies, a secondary element mechanically separate from said primary deflecting element and adapted to be deflected in one sense or in another sense under control of said primary deflecting element, phase responsive means controlled by said pick-up coil to actuate said secondary element in said one sense or said another sense depending upon the phase of the alternating current induced in said pick-up coil, and means responsive to deflections of said pick-up coil to control the operation of said last mentioned means to render the operation of the secondary element substantially independent of transient deflections of said primary deflecting element and pick-up coil.

22. Measuring apparatus including a self balancing electrical network, means responsive to the variations in a condition under measurement to unbalance said network, a device to rebalance said network, a reversible electrical motor to actuate said device, and means to control the operation of said device including a primary deflecting element responsive to the state of balance of said network, means to establish an alternating field including an element adapted to be connected to a source of alternating current, a pick-up coil disposed in said field, a mechanical connection between said primary deflecting element and said pick-up coil whereby the latter is related to zero inductive position in said alternating field or in either direction therefrom to thereby cause the induction of an alternating current of one phase or of opposite phase in said pick-up coil accordingly as said condition varies, phase responsive means controlled by said pick-up coil to control the energization of said reversible electrical motor, and means responsive to deflections of said pick-up coil to control the operation of said phase responsive means to render the operation of said reversible electrical motor substantially independent of transient deflections of said primary deflecting element and pick-up coil.

HARRY S. JONES.